US009974110B2

(12) United States Patent
Hedman et al.

(10) Patent No.: US 9,974,110 B2
(45) Date of Patent: *May 15, 2018

(54) CONTROLLING A PACKET FLOW FROM A USER EQUIPMENT

(71) Applicant: TELEFONAKTIEBOLAGET LM ERICSSON (PUBL), Stockholm (SE)

(72) Inventors: Peter Hedman, Helsingborg (SE); Christian Herrero Verón, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/260,810

(22) Filed: Sep. 9, 2016

(65) Prior Publication Data

US 2016/0380917 A1 Dec. 29, 2016

Related U.S. Application Data

(63) Continuation of application No. 14/542,987, filed on Nov. 17, 2014, now Pat. No. 9,467,391, which is a
(Continued)

(51) Int. Cl.
*H04W 76/06* (2009.01)
*H04L 29/06* (2006.01)
(Continued)

(52) U.S. Cl.
CPC ......... *H04W 76/064* (2013.01); *H04L 47/803* (2013.01); *H04L 63/1458* (2013.01); *H04W 4/22* (2013.01); *H04W 8/245* (2013.01);
*H04W 12/10* (2013.01); *H04W 12/12* (2013.01); *H04W 28/0247* (2013.01); *H04W 76/02* (2013.01); *H04W 76/007* (2013.01); *H04W 76/022* (2013.01)

(58) Field of Classification Search
CPC .. H04L 47/803; H04W 76/02; H04W 76/064; H04W 28/0247; H04W 12/10; H04W 12/12; H04W 8/245; H04W 4/22; G06F 21/50
See application file for complete search history.

(56) References Cited

U.S. PATENT DOCUMENTS 5,208,810 A    5/1993  Park
7,299,035 B2 * 11/2007 Morota .................. G06F 21/564
                                              455/414.1

(Continued)

FOREIGN PATENT DOCUMENTS

JP         2001-268095 A      9/2001

*Primary Examiner* — Gary Mui

(57) ABSTRACT

A method and User Equipment (UE) for limiting excessive packet flow from the UE to a communication network. The UE receives from the network, an instruction to activate a logic parameter for controlling the packet flow from the UE to the network. In response to receiving the instruction, the UE requests configuration of a network connection for transmitting packets to the network according to the logic parameter. The UE then requests deactivation of all other network connections upon successful configuration of the network connection for transmitting packets to the network according to the logic parameter.

20 Claims, 3 Drawing Sheets

Related U.S. Application Data continuation of application No. 13/608,484, filed on Sep. 10, 2012, now Pat. No. 8,902,746, which is a continuation of application No. 12/694,378, filed on Jan. 27, 2010, now Pat. No. 8,289,848.

(60) Provisional application No. 61/149,183, filed on Feb. 2, 2009.

(51) Int. Cl.

| | | |
|---|---|---|
| *H04W 4/22* | (2009.01) | |
| *H04W 8/24* | (2009.01) | |
| *H04W 12/12* | (2009.01) | |
| *H04L 12/927* | (2013.01) | |
| *H04W 12/10* | (2009.01) | |
| *H04W 28/02* | (2009.01) | |
| *H04W 76/02* | (2009.01) | |
| *H04W 76/00* | (2018.01) | |

(56) References Cited

U.S. PATENT DOCUMENTS

| | | |
|---|---|---|
| 2002/0178375 A1 | 11/2002 | Whittaker et al. |
| 2002/0186845 A1 | 12/2002 | Dutta et al. |
| 2004/0047339 A1 | 3/2004 | Wang et al. |
| 2004/0179490 A1 | 9/2004 | Jang et al. |
| 2005/0154899 A1* | 7/2005 | Marvel ............... G06F 21/64 713/187 |
| 2005/0157647 A1 | 7/2005 | Sterne et al. |
| 2005/0213598 A1* | 9/2005 | Lin ................. H04L 43/0811 370/437 |
| 2006/0120287 A1 | 6/2006 | Foti et al. |
| 2006/0236390 A1* | 10/2006 | Matovsky ............ G06F 21/55 726/22 |
| 2006/0272025 A1 | 11/2006 | Mononen |
| 2007/0206546 A1 | 9/2007 | Alberth et al. |
| 2007/0240222 A1 | 10/2007 | Tuvell et al. |
| 2008/0320149 A1 | 12/2008 | Faccin |
| 2009/0016282 A1 | 1/2009 | Gasparroni et al. |
| 2009/0040964 A1 | 2/2009 | Zhao et al. |
| 2009/0077664 A1 | 3/2009 | Hsu et al. |
| 2009/0097407 A1 | 4/2009 | Buskirk et al. |
| 2009/0116440 A1 | 5/2009 | Zhao et al. |
| 2009/0245177 A1 | 10/2009 | Zhao et al. |
| 2009/0262736 A1 | 10/2009 | Zhao et al. |
| 2009/0316656 A1 | 12/2009 | Zhao et al. |
| 2009/0323528 A1 | 12/2009 | Loiacono et al. |
| 2010/0027448 A1 | 2/2010 | Puthiyandyil et al. |
| 2010/0169972 A1 | 7/2010 | Kuo et al. |
| 2010/0260143 A1 | 10/2010 | Tanabe et al. |
| 2011/0007748 A1 | 1/2011 | Yin et al. |
| 2011/0096749 A1 | 4/2011 | Rune |
| 2011/0164566 A1 | 7/2011 | Xiong |
| 2011/0211557 A1 | 9/2011 | Cheng et al. |

\* cited by examiner

CONTROLLING A PACKET FLOW FROM A USER EQUIPMENT

CROSS-REFERENCE TO RELATED APPLICATIONS

This application is a continuation of co-pending U.S. patent application Ser. No. 14/542,987 filed on Nov. 17, 2014, which is a continuation of U.S. patent application Ser. No. 13/608,484 filed on Sep. 10, 2012, now U.S. Pat. No. 8,902,746, which is a continuation of Ser. No. 12/694,378 filed on Jan. 27, 2010, now U.S. Pat. No. 8,289,848, which claims the benefit of U.S. Provisional Application No. 61/149,183 filed Feb. 2, 2009, the disclosures of which are incorporated by reference herein in their entireties.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to radio telecommunication systems. More particularly, and not by way of limitation, the present invention is directed to a method, device, and node for controlling a packet flow from a User Equipment (UE) in a radio telecommunication system.

Today, several actors are involved in managing the software and hardware of a UE, such as a mobile telephone or other communication device in a wireless communication system. The software can be applications, services, and modules, including the operating system stored in and used by the UE. The UE's manufacturer typically installs a collection of software in the UE at the time the device is manufactured. Later, an end user may modify the UE's software by downloading to the UE, applications and the like from different sources via, for example, the Internet. The UE's manufacturer, the operator of the communication system to which the UE is subscribed or in which the UE is visiting, and/or an authorized third party, depending on business agreements, may also remotely modify part or all of the UE's software.

After such modifications and in other instances, the UE may behave improperly. From a system operator's point of view, for example, improper behavior may include the UE's diminishing the capacity of the communication system by increasing the number of control or other messages exchanged with the system. Improper UE behavior can arise in a number of ways, such as unexpected interactions between software modules in the UE, malicious software modules, and the like. A user might download a malicious or malformed application such as a Java application, which interacts with the network-protocol stack through open Application Programming Interfaces (APIs) in the UE. As a result, the UE may repeatedly send service requests to an operator's network.

Techniques for dealing with improper UE behavior by disabling services to a UE have been discussed in standardization organizations such as the Third Generation Partnership Project (3GPP). The 3GPP promulgates specifications for the GSM telecommunications system and its enhancements such as Enhanced Data Rates for GSM Evolution (EDGE), the universal mobile telecommunications system (UMTS), the Long Term Evolution (LTE) access network, and systems employing wideband code-division multiple access (WCDMA).

The Third Generation Partnership Project Technical Specification, 3GPP TS 24.305, describes procedures for managing settings of the UE for remotely disabling selected UE capabilities, used over a 3GPP access, i.e., a circuit-switched (CS) and packet-switched (PS) domain over GERAN/UTRAN radio access.

The Open Mobile Alliance (OMA) has developed specifications for Device Management (DM) of communication devices, and versions 1.1.2 and 1.2 of those specifications define a protocol for managing configuration, data, and settings in communication devices. OMA standards and other information are publicly available through the OMA organization. OMA DM can be used to manage the configuration and Management Objects (MOs) of UEs from the point of view of different DM Authorities, including setting initial configuration information in UEs, subsequently updating persistent information in UEs, retrieving management information from UEs, and processing events and alarms generated by UEs. An MO is generally a software object that may be written, for example, according to SyncML, which is a mark-up language specification of an XML-based representation protocol, synchronization protocol, and DM protocol, transport bindings for the protocols, and a device description framework for DM. Using OMA DM, third parties can configure UEs on behalf of end users. A third party, such as a network operator, service provider, and corporate information management department can remotely set UE parameters and install or upgrade software through suitable MOs in the UE.

The Evolved Packet System (EPS) has been defined since 3GPP release-8 as a system for mobile communication using packet data over an evolved GPRS network. The core network is an evolved UMTS packet core network and the radio access network may be an evolved UTRAN (E-UTRAN), a non-3GPP access network (for example WLAN), or a combination of both. The 3GPP Technical Specifications, 3GPP TS 23.401 and 3GPP TS 24.301, describe the GPRS enhancements for E-UTRAN access.

To stay registered in the EPS, an EPS bearer must be retained, as otherwise the EPS mobility procedures will be rejected by the EPS network, as described in 3GPP TS 23.401. Also, as described in 3GPP TS 24.305, the OMA DM server controlling the Selective Disabling of a 3GPP UE Capabilities Management Object (SDoUE MO) needs to be able to push down updates of the MO to the UE. The push of MO updates using SMS cannot always be assumed to be available unless both the UE and the network support SMS using CS Fallback capabilities described in 3GPP TS 23.272, and even then a PS access is required to be open. Thus, the MO update may need to be sent over the PS access. Therefore, the PS access open in the UE needs to be accessible by the OMA DM server. Consequently, an EPS bearer towards a Packet Data Network (PDN) needs to be retained until the software in the UE has been updated. This may imply a risk of flooding the network with malicious traffic if the UE has been hacked.

BRIEF SUMMARY OF THE INVENTION

The present invention solves or at least mitigates the risk of flooding the radio access network and core network with malicious UE-initiated traffic. The invention enables the UE to retain a PDN connection with an EPS bearer open that enables the OMA DM server to communicate with the UE and ensure the EPS mobility procedure works. In one embodiment, the invention provides the operator with the ability to provision an Access Point Name (APN) and a Traffic Flow Template (TFT) to be used until the operator has enabled UE-initiated EPS services again.

Thus, in one embodiment, the present invention is directed to a method in a UE for limiting packet flow from the UE to a communication network. The method includes the steps of receiving from the network, an instruction to activate a logic parameter for controlling the packet flow from the UE to the network; requesting configuration of a network connection for transmitting packets to the network according to the logic parameter; and requesting deactivation of all other network connections. The logic parameter may be in a management object, and may be pre-stored in the UE, or may accompany the instruction.

In another embodiment, the present invention is directed to a UE that includes means for receiving from a communication network, an instruction to activate a logic parameter for controlling a packet flow from the UE to the network; means for requesting configuration of a network connection for transmitting packets to the network according to the logic parameter; and means for requesting deactivation of all other network connections.

In another embodiment, the present invention is directed to a device management server in a communication network for remotely controlling a packet flow from a mobile communication device. The server includes means for storing a management object that includes at least one of: a flag, a defined Access Point Name (APN), and a logic parameter for controlling the packet flow from the mobile communication device to the network; and means for downloading the management object to the mobile communication device. The flag, when downloaded to the mobile communication device, causes the device to activate the logic parameter in the management object or to activate a stored logic parameter in the device. The defined APN, when downloaded to the mobile communication device, causes the device to send a request to establish a new connection to the network on which packet flow from the device is controlled according to the logic parameter.

In another embodiment, the present invention is directed to a Packet Data Network (PDN) Gateway. The PDN Gateway includes means for receiving from a UE, a PDN connectivity request to establish a new PDN connection; and means for limiting a packet flow from the UE on the new PDN connection according to defined parameters.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1:
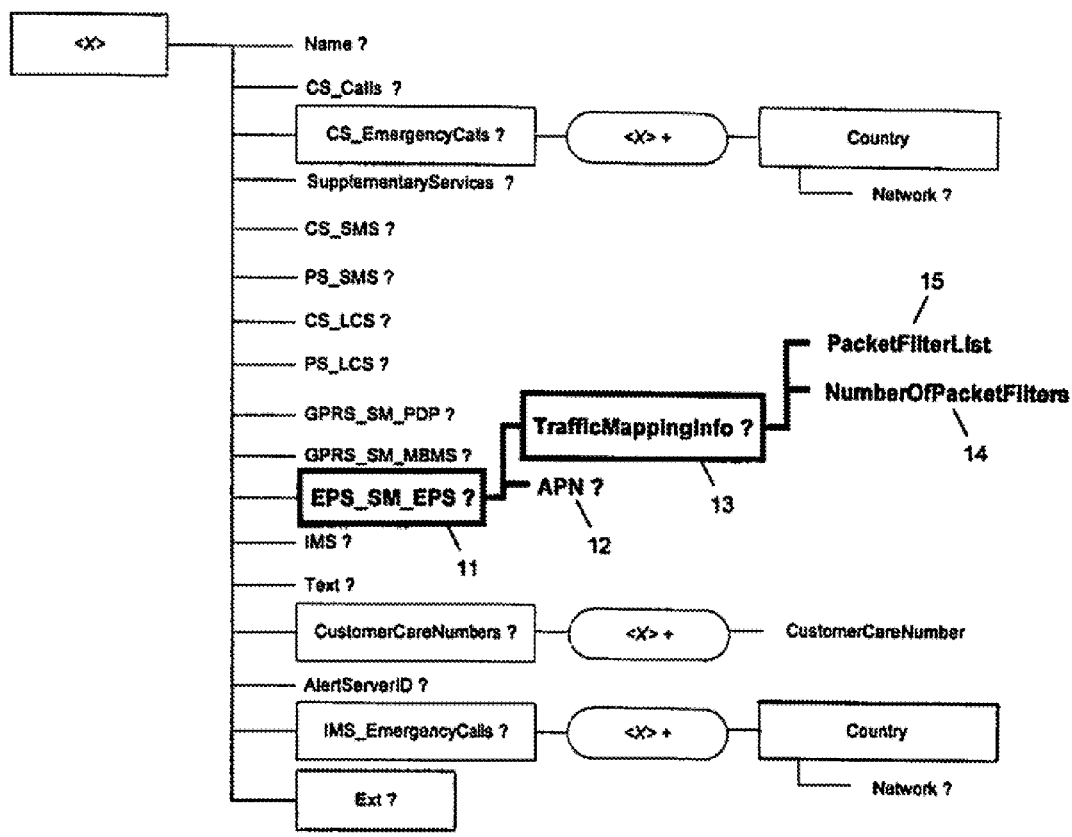
FIG. 1 is a tree diagram of an enhanced Selective Disabling of 3GPP UE Capabilities Management Object (SDoUE MO+) in an exemplary embodiment of the present invention, with nodes added by the present invention indicated in boldface type.

For economy of explanation, this application focuses on wireless communication systems that comply with specifications promulgated by the 3GPP, but it should be understood that the principles described in this application can be implemented in other communication systems. It will also be understood that this description is written in terms of OMA DM, but this description should not be interpreted as being limited to OMA DM. Independent of the mechanism used to disable or enable services in a UE, it is advantageous for the UE to be selectively controllable in a standardized way.

The present invention updates 3GPP TS 24.305 procedures to handle the difference between EPS (3GPP TS 24.301) and GPRS (3GPP TS 24.008). The disabling of EPS is different than for GPRS. In EPS, the UE can request procedures for EPS contexts, but only the network can initiate them (this, in normal cases, includes the case of deactivation). Therefore, in exemplary embodiments of the present invention, the operator is provided with the ability to disable mobile-requested EPS Session Management (SM) procedures. In one embodiment, a logic parameter is downloaded to the UE, causing the UE to request a new PDN connection towards the network with either a defined APN or no APN if the defined APN is not available for the UE. The UE requests deactivation of all previously existing PDN connections, and utilizes a particular traffic flow mapping for an EPS context that provides the network operator with control of packet access from UE applications.

In another embodiment, the logic parameter causes the UE to send the defined APN in the request for a new PDN connection. The defined APN causes the network to establish the new PDN connection with a particular PDN GW, configured to control the traffic flow from the UE in accordance with the particular traffic flow mapping. Optionally, the PDN GW may push traffic flow mapping parameters to the UE.

It should be noted that in different configurations of the 3GPP network architecture, the gateway may utilize either the GPRS Tunneling Protocol (GTP) or the Proxy Mobile IP (PMIP) protocol as a network mobility protocol. When GTP is utilized, it is the PDN GW that may push traffic flow mapping parameters to the UE. When PMIP is utilized, the Serving GW may provide this part of the PDN GW functionality. Thus, when the PDN GW is referred to herein, the term is intended to include the functionality of pushing traffic flow mapping parameters to the UE, whether the push is made by the PDN GW or by the Serving GW.

In another embodiment, the logic parameter causes the UE to utilize an existing PDN connection towards the network rather than establishing a new connection. Again, the UE requests deactivation of other PDN connections, if any, and utilizes a particular traffic flow mapping for an EPS context that provides the network operator with control of packet access from UE applications.

In another embodiment, the OMA DM server may know that the UE includes an internal application to ensure that only the application(s) controlling the connection towards the OMA DM server, and potentially emergency calls, are allowed access to use the PS connection. In such case, the OMA DM server does not have to download any APN or logic parameter to the UE. Instead, the OMA DM server may send only a flag instructing the UE to activate the internal application.

Once the network operator has control of packet access from UE applications, the operator can prevent a misbehaving UE from flooding the network with malicious or erroneous traffic. As part of the correction process, a device management server such as an OMA DM server can push corrective software to the UE to correct or replace a corrupted application causing the misbehavior. In addition, the logic parameter may also limit the packet flow to a maximum data rate or a maximum packet size.

FIG. 1 is a tree diagram of an enhanced Selective Disabling of 3GPP UE Capabilities Management Object (SDoUE MO+) in an exemplary embodiment of the present invention, with nodes added by the present invention indicated in boldface type. Those skilled in the art will understand that the modified SDoUE MO+ is a software module that includes parameters that can be used to manage settings of the UE for remotely disabling and enabling selected capabilities of the UE. The identifier for an existing SDoUE MO is "urn:oma:mo:ext-3gpp-sdoue:1.0". The OMA DM Access Control List (ACL) property mechanism as standardized (see Enabler Release Definition OMA-ERELD-DM-V1_2 [8]) may be used to grant or deny access rights to OMA DM servers in order to modify nodes and leaf objects of the SDoUE MO.

In an exemplary embodiment of the present invention, the existing SDoUE MO is enhanced to support the case of EPS with the addition of the following new nodes: EPS_SM_EPS, APN, TrafficMappingInfo, NumberOfPacketFilters, and PacketFilterList. When downloaded to the UE, the enhanced SDoUE MO+ adds at least the following capabilities to a device management server such as an OMA DM server:

1. The capability to separately disable UE-initiated EPS procedures such as UE-requested PDN connectivity, UE-requested bearer resource modification, and UE-requested PDN disconnect, as well as to provide restriction to EPS services.

2. The capability to provision a special APN to which the UE can set up a PDN connection. This enables the PDN Gateway (PDN GW) to restrict the UE traffic to only traffic necessary for communication with the OMA DM server and potentially IP Multimedia Subsystem (IMS) emergency calls.

3. The capability to locally install the essential Uplink Traffic Flow Template (UL TFT) parameters in the UE to restrict the UE's ability to send IP packets other than those allowed by the operator, for example those required towards the OMA DM server.

If an APN is provided in the SDoUE MO+, the PDN connection may be established with a PDN GW that is pre-configured with TFT-type information that can be set on the EPS bearer. However, if no APN is provided, the operator may establish the PDN connection to another PND GW utilizing a default APN.

With continuing reference to FIG. 1, the following paragraphs describe additions required to the indicated sections of 3GPP TS 24.305 in order to describe the new nodes and leaf objects of the enhanced SDoUE MO+ management object:
/<X>/EPS_SM_EPS
The EPS Session Management (SM) procedures for EPS contexts (EPS_SM_EPS) interior node 11 is a flag indicating an operator's preference to enable or disable mobile-requested EPS SM procedures for EPS contexts, i.e., UE-requested PDN connectivity, UE-requested bearer resource modification, and UE-requested PDN disconnect, as well as to provide restriction to EPS services.

The EPS SM procedures for EPS contexts are specified in 3GPP TS 24.301 [5A].
Occurrence: ZeroOrOne
Format: bool
Access Types: Get
Values: 0, 1
  0—Indicates that mobile-requested EPS SM procedures for EPS contexts are enabled and no restriction to EPS services applies.
  1—Indicates that mobile-requested EPS SM procedures for EPS contexts are disabled and restriction to EPS services applies.
/<X>/APN
The APN leaf object 12 provides the information of an access point name.
Occurrence: ZeroOrOne
Format: chr
Access Types: Get
Values: <Access point name>
The format of the APN is defined by 3GPP TS 23.003 [2A] in clause 9.
EXAMPLE: mycompany.mnc012.mcc340.gprs
/<X4TrafficMapping Info
The TrafficMappingInfo interior node 13 is used to enable configuring the minimum acceptable traffic flow template (TFT) parameters (packet filters) for EPS context according to the operator's preference.
Occurrence: ZeroOrOne
Format: node
Access Types: Get
Values: N/A
The information provided by the TrafficMappingInfo interior node is used by the UE only when the EPS_SM_EPS leaf value is set to "1".
/<X>/NumberOfPacketFilters
The NumberOfPacketFilters leaf object 14 indicates the number of traffic filters contained in the PacketFilterList leaf 15.
Occurrence: One
Format: int
Access Types: Get
Values: <Number of packet filters>
The NumberOfPacketFilters is an unsigned 8-bit integer, and the value range is defined as the number of packet filters parameter in the traffic flow template information element (see subclause 10.5.6.12 in 3GPP TS 24.008 [3]).
EXAMPLE: 3 (packet filters)
/<X>/PacketFilterList
The PacketFilterList leaf object 15 provides the information of a variable number of traffic filters.
Occurrence: One
Format: int
Access Types: Get
Values: <Packet filter list information>
The PacketFilterList is an unsigned 64-bit integer. The bit pattern shall be encoded as the packet filter list parameter in the traffic flow template information element (see subclause 10.5.6.12 in 3GPP TS 24.008 [3]) with the least significant bit in the rightmost position of the integer. For example, if the parameter is encoded into bits 6, 7, and 8 in 3GPP TS 24.008 [3], then it must be encoded into bits 1, 2, and 3 in this leaf.

Figure 2:
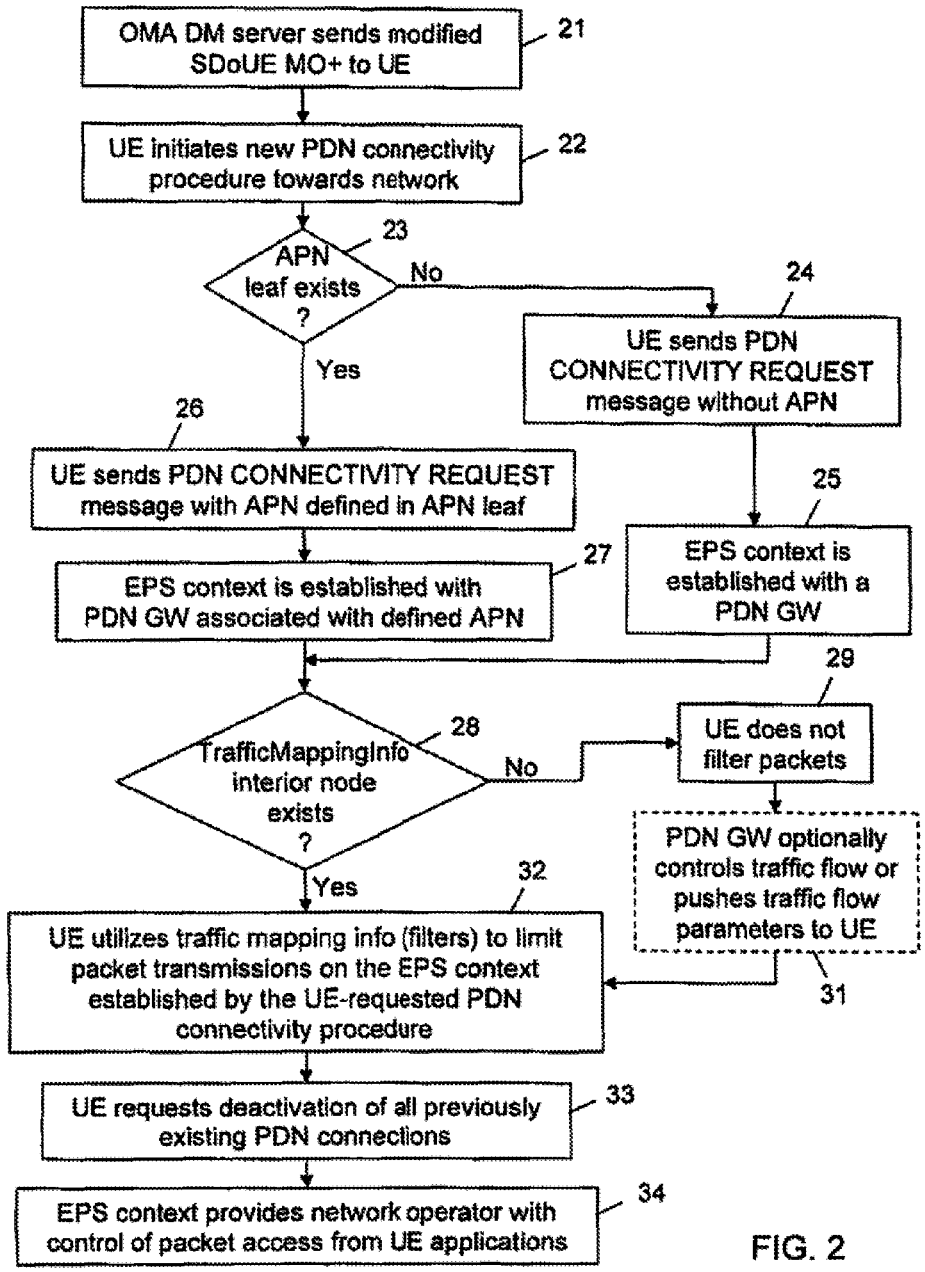
FIG. 2 is a flow chart illustrating the steps of an exemplary embodiment of the method of the present invention.

FIG. 2 is a flow chart illustrating the steps of an exemplary embodiment of the method of the present invention. When the value of the EPS_SM_EPS leaf 11 is set to "1", the method proceeds as follows:

At step 21, the OMA DM server sends the modified SDoUE MO+ to the UE. At step 22, the UE initiates a new UE-requested PDN connectivity procedure toward the network as described in 3GPP TS 24.301 [6A]. At step 23, it is determined whether the APN leaf 12 exists in the modified SDoUE MO+. If the APN leaf 12 does not exist, the method moves to step 24 where the UE sends a PDN CONNECTIVITY REQUEST message without including any APN in the message, and the network utilizes a default APN for establishing an EPS context with a PDN GW at step 25. However, if the APN leaf exists, the method moves instead to step 26 where the UE sends the PDN CONNECTIVITY REQUEST message and includes the value defined in the APN leaf as the APN in the message. At step 27, the network utilizes the defined APN for establishing an EPS context with a PDN GW associated with the defined APN.

After successful completion of the UE-requested PDN connectivity procedure at step 27, it is determined at step 28 whether the TrafficMappingInfo interior node 13 exists in the modified SDoUE MO+. The TrafficMappingInfo interior node, as shown in FIG. 1, provides at least one logic parameter for controlling the packet flow from the UE. If the TrafficMappingInfo node does not exist, the method moves to step 29 where the UE transmits packets on the new PDN connection without filtering the packets. At step 31, the PDN GW associated with the defined APN may optionally be configured to control the traffic flow from the UE or to download to the UE, a logic parameter for controlling the traffic flow from the UE. At step 32, the UE utilizes the logic parameter (i.e., traffic mapping information filters) to limit packet transmissions on the EPS context established by the UE-requested PDN connectivity procedure. Returning to step 28, if it is determined that the TrafficMappingInfo interior node does exist in the SDoUE MO+, the method moves directly to step 32.

Furthermore, the UE continues to limit packet transmissions on the EPS context in accordance with the logic parameter until the EPS_SM_EPS leaf value is reset to "0". The UE is however allowed to temporarily stop using the traffic mapping information in the following cases:

upon receipt of an OMA DM notification message indicating that the UE shall initiate an OMA DM session to the OMA DM server that either had set the disable value of the EPS_ SM_EPS leaf or is the one stored in the AlertServerID leaf; and when the UE wishes to either establish an emergency call over IMS (if the IMS_EmergencyCalls value is set to "0") or send an OMA DM generic alert message according to sub-clause 5.17A of 3GPP TS 24.305.

At step 33, the UE initiates the signaling procedure for UE-requested PDN disconnection as described in 3GPP TS 24.301 [6A] of all previously existing PDN connections, thus leaving only the new one, which was established by the successful completion of the UE-requested PDN connectivity procedure. At step 34, the EPS context provides the network operator with control of packet access from UE applications. As noted above, in EPS, the UE can request procedures for EPS contexts, but only the network can initiate them (for normal cases, this includes the case of deactivation). Therefore, in this exemplary embodiment of the present invention, the operator is provided with the ability to disable mobile-requested EPS Session Management (SM) procedures.

It should be noted that the invention is not restricted to a specific order of the PDN connectivity request procedure and the deactivation of existing bearers; the only restriction is that the UE always need to keep at least one PDN connection to avoid getting detached from the EPS. A different order may be required in case the UE and/or EPS is currently using the maximum number of EPS bearers supported by the UE and/or the EPS (e.g., Mobility Management Entity (MME), Serving GW, or PDN GW). For example, the UE may receive a rejection of an initial PDN connectivity request, and in response, first deactivate one of the available PDN connections to free up resources before initiating the PDN connectivity procedure for the PDN connection to be used towards the OMA DM server.

Figure 3:
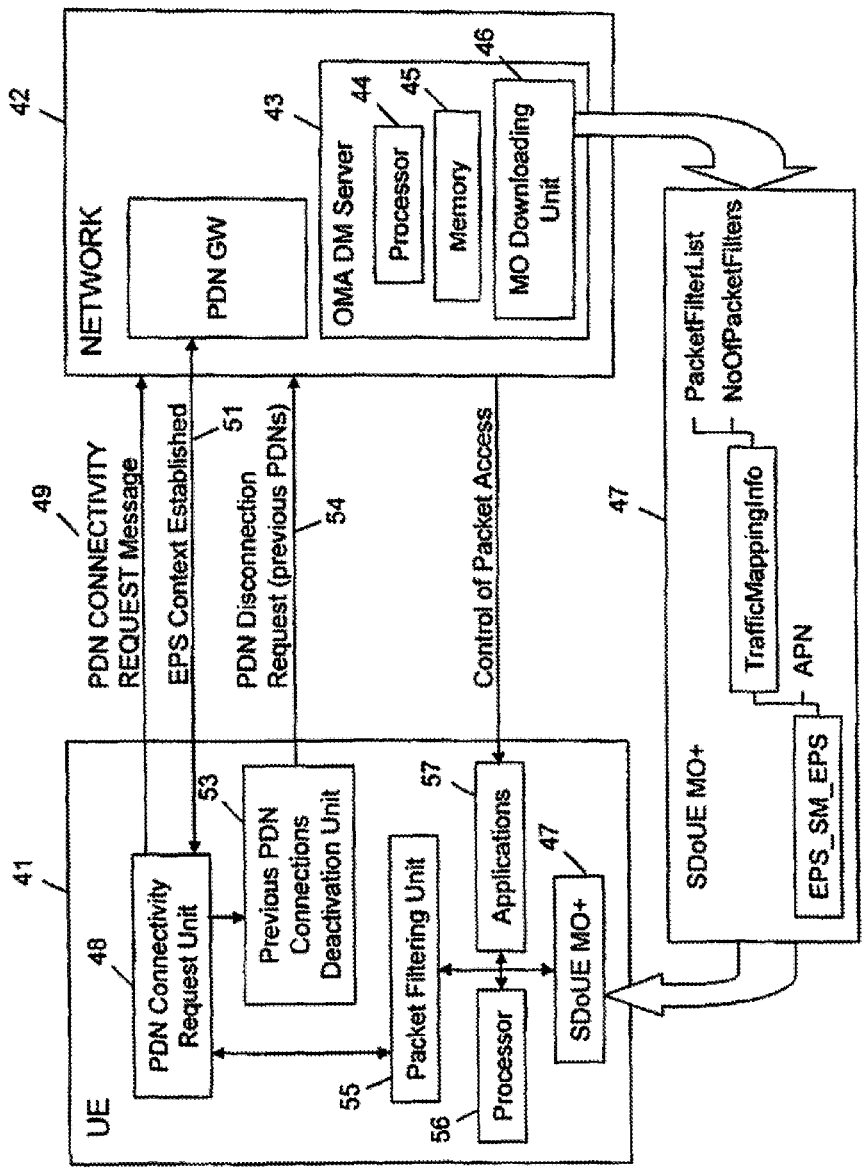
FIG. 3 is a simplified block diagram of a User Equipment (UE) and associated nodes in a network in an exemplary embodiment of the present invention.

FIG. 3 is a simplified block diagram of a UE 41 and associated nodes in a network 42 in an exemplary embodiment of the present invention. For simplicity, only those components in the UE and those nodes in the network that are associated with the present invention are shown. The network includes a device management server such as an OMA DM Server 43, the operation of which may be controlled by a processor 44. A memory 45 may store management objects such as the SDoUE MO+ of the present invention. An MO downloading unit 46 downloads the SDoUE MO+ 47 to the UE 41.

Receipt of the SDoUE MO+ in the UE causes a PDN connectivity request unit 48 to initiate a new PDN connectivity procedure by sending a PDN CONNECTIVITY REQUEST message 49 to the network 42. The network establishes a new EPS Context 51 between the UE and a PDN GW 52. Upon establishment of the new EPS Context, a previous PDN connections deactivation unit 53 sends a PDN disconnection request 54 to the network to disconnect any previously established PDN connections. This leaves only the new EPS Context in place between the UE and the network, and packet transmissions from the UE over this context are controlled by the logic parameter (packet filters) in the SDoUE MO+. Thus, the network has control of packet access through a packet filtering unit 55 as controlled by a processor 56 and applications 57.

In this manner, the present invention solves or at least mitigates the risk of flooding the radio access network and core network with malicious UE-initiated traffic. The invention enables the UE to retain a PDN connection with an EPS bearer open until the software in the UE has been updated.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a User Equipment (UE) for restricting packet flow transmission from the UE to a Packet Data Network (PDN), wherein a corrupted application in the UE is causing excessive packet flow transmission from the UE, the method comprising the steps of:

receiving by the UE, an instruction to restrict packet flow transmission from the UE to the PDN, wherein the UE has at least one previously existing PDN connection;

in response to receiving the instruction, sending from the UE to the PDN, a request to establish a new PDN connection in accordance with the received instruction and according to a logic parameter for restricting packet flow transmission from the UE to the PDN, wherein the logic parameter is either stored in the UE or received with the instruction;

upon establishment of the new PDN connection:
  requesting by the UE, deactivation of the at least one previously existing PDN connection;
  utilizing the new PDN connection for packet flow transmission from the UE to the PDN; and
  receiving software from the PDN to repair or replace the corrupted application.

2. The method as recited in claim 1, wherein the step of receiving the instruction includes receiving by the UE, a flag to activate a previously configured internal application that triggers the requesting steps.

3. The method as recited in claim 1, wherein the step of receiving the instruction includes receiving by the UE, a flag to activate the logic parameter for restricting packet flow transmission from the UE to the PDN, wherein the logic parameter has been previously stored in the UE.

4. The method as recited in claim 3, wherein the logic parameter controls the UE to halt all applications except an application for communicating with a device management server and an application for sending emergency transmissions.

5. The method as recited in claim 1, wherein the step of receiving the instruction includes receiving by the UE, the logic parameter for restricting packet flow transmission from the UE to the PDN and a flag to activate the logic parameter.

6. The method as recited in claim 5, wherein the logic parameter and the flag to activate the logic parameter are received by the UE from a device management server.

7. The method as recited in claim 5, wherein the step of receiving the logic parameter and the flag includes:
  receiving the logic parameter by the UE from a PDN Gateway; and
  receiving the flag to activate the logic parameter by the UE from a device management server.

8. The method as recited in claim 7, wherein the step of receiving the logic parameter from the PDN Gateway includes the steps of:
  receiving by the UE from the device management server, a defined Access Point Name (APN) for the new PDN connection; and
  sending the defined APN from the UE to the PDN in a request to establish the new PDN connection, the defined APN causing the PDN to establish the new PDN connection to the PDN Gateway, which is configured to download the logic parameter to the UE.

9. The method as recited in claim 1, wherein the step of sending the request to establish the new PDN connection includes sending from the UE to the PDN, a request to reconfigure one of the previously existing PDN connections according to the logic parameter.

10. An apparatus in a User Equipment (UE) for restricting packet flow transmission from the UE to a Packet Data Network (PDN) when a corrupted application in the UE causes excessive packet flow transmission from the UE, the apparatus comprising a processor coupled to a non-transitory memory for storing computer program instructions, wherein when the processor executes the computer program instructions, the processor causes the apparatus to:
  receive an instruction to restrict packet flow transmission from the UE to the PDN, wherein the UE has at least one previously existing PDN connection;
  in response to receiving the instruction, send to the PDN, a request to establish a new PDN connection in accordance with the received instruction and according to a logic parameter for restricting packet flow transmission from the UE to the PDN, wherein the logic parameter is either stored in the UE or received with the instruction;
  upon establishment of the new PDN connection:
    request deactivation of the at least one previously existing PDN connection;
    utilize the new PDN connection for packet flow transmission from the UE to the PDN; and
    receive software from the PDN to repair or replace the corrupted application.

11. The apparatus as recited in claim 10, wherein the apparatus stores the logic parameter for restricting packet flow transmission from the UE to the PDN in an inactive state until receipt of the instruction causes the apparatus to activate the logic parameter.

12. The apparatus as recited in claim 10, wherein the apparatus is configured to send the request to establish the new PDN connection by sending a request to reconfigure one of the previously existing PDN connections to provide a reconfigured PDN connection on which packet flow transmission by the UE is restricted.

13. The apparatus as recited in claim 10, wherein a defined Access Point Name (APN) for the new PDN connection is either specified by the apparatus or selected as a default by the PDN.

14. The apparatus as recited in claim 10, wherein when receiving the instruction, the apparatus is configured to receive a flag to activate a previously configured internal application that triggers the apparatus to send the request to the PDN to establish the new PDN connection.

15. The apparatus as recited in claim 10, wherein when receiving the instruction, the apparatus is configured to receive a flag to activate the logic parameter for restricting packet flow transmission from the UE to the PDN, wherein the logic parameter has been previously stored in the UE.

16. The apparatus as recited in claim 15, wherein the logic parameter controls the UE to halt all applications except an application for communicating with a device management server and an application for sending emergency transmissions.

17. The apparatus as recited in claim 10, wherein when receiving the instruction, the apparatus is configured to receive the logic parameter for restricting packet flow transmission from the UE to the PDN and a flag to activate the logic parameter.

18. The apparatus as recited in claim 17, wherein the logic parameter and the flag to activate the logic parameter are received by the apparatus from a device management server.

19. The apparatus as recited in claim 17, wherein the apparatus is configured to receive the logic parameter and the flag by:
  receiving the logic parameter from a PDN Gateway; and
  receiving the flag to activate the logic parameter from a device management server.

20. A method in a User Equipment (UE) for restricting packet flow transmission from the UE to a Packet Data Network (PDN), the method comprising the steps of:
  receiving by the UE, an instruction to restrict packet flow transmission from the UE to the PDN, wherein the UE has at least one previously existing PDN connection;
  in response to receiving the instruction, requesting by the UE, establishment of a new PDN connection in accordance with the received instruction;
  upon establishment of the new PDN connection:
    requesting by the UE, deactivation of the at least one previously existing PDN connection; and utilizing the new PDN connection for packet flow transmission from the UE to the PDN;

wherein the step of receiving the instruction includes receiving one of:
- a flag to activate a previously configured internal application that triggers the requesting steps,
- a flag to activate a logic parameter for restricting packet flow transmission from the UE to the PDN, wherein the logic parameter has been previously stored in the UE, or
- a logic parameter for restricting packet flow transmission from the UE to the PDN and a flag to activate the logic parameter.

* * * * *

UNITED STATES PATENT AND TRADEMARK OFFICE
CERTIFICATE OF CORRECTION

PATENT NO. : 9,974,110 B2  
APPLICATION NO. : 15/260810  
DATED : May 15, 2018  
INVENTOR(S) : Hedman et al.

It is certified that error appears in the above-identified patent and that said Letters Patent is hereby corrected as shown below:

On the Title Page

In Column 1, under "Notice", Line 3, delete "0 days. days." and insert -- 0 days. --, therefor.

In the Figure, delete " 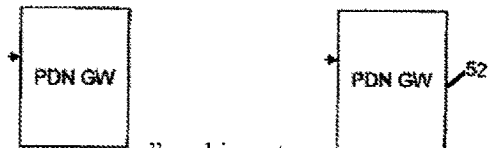 " and insert -- --, therefor.

In the Drawings

In Fig. 3, Sheet 3 of 3, delete "  " and insert -- --, therefor.

In the Specification

In Column 1, Line 9, delete "2014," and insert -- 2014, now U.S. Pat. No. 9,467,391, --, therefor.

In Column 1, Line 11, delete "Ser. No." and insert -- U.S. Patent application Ser. No. --, therefor.

In Column 3, Line 55, delete "DRAWING" and insert -- DRAWINGS --, therefor.

In Column 6, Line 27, delete "/<X4TrafficMapping" and insert -- /<X>/TrafficMapping --, therefor.

Signed and Sealed this  
Fifteenth Day of January, 2019

Andrei Iancu  
*Director of the United States Patent and Trademark Office*